June 23, 1964 H. H. KOLM ETAL 3,138,688

HIGH-CURRENT DISCONNECT SWITCH FOR MULTIPLE-LEAF BUS SYSTEMS

Filed Aug. 4, 1960

INVENTORS
DONALD BRUCE MONTGOMERY
HENRY N. KOLM
BY
Edward D. Thomas
AGENT

United States Patent Office 3,138,688

Patented June 23, 1964

3,138,688

HIGH-CURRENT DISCONNECT SWITCH FOR MULTIPLE-LEAF BUS SYSTEMS

Henry H. Kolm and Donald Bruce Montgomery, Wayland, Mass., assignors, by mesne assignments, to Massachusetts Institute of Technology, a corporation of Massachusetts Filed Aug. 4, 1960, Ser. No. 47,516
12 Claims. (Cl. 200—165)

The present invention relates to a high-current disconnect switch and particularly to a disconnect switch suitable for interconnecting two or more multiple-leaf bus lines.

In many high-current distribution systems involving multiple generators and/or multiple loads, it is necessary to provide optional interconnection at numerous intersections of multiple-leaf bus runs. This is normally accomplished by providing either bolted links or mechanical disconnect switches of the cam or knife-blade type. The former method is too cumbersome wherever frequent changes in connection are necessary, and the latter method is very costly. The prior art switches make it necessary to interrupt all but one of the bus runs being interconnected at an intersection, and to insert elaborate angles, insulated hangers and usually flexible braid joints for stress relief. A high-field magnet laboratory of 8,000 kw. capacity for example, may require a minimum of 64 such node connections of 10,000 ampere capacity, and the cost of satisfying these requirements by means of commercially available disconnect switches represents a major fraction of the total cost of the D.-C. distribution system.

The present invention contemplates making and breaking contacts within a hermetically sealed chamber at the intersection of two bus runs by means of hydraulic pressure. The elimination of the usual wiping action permits the application of high contact pressure to obtain negligible contact resistance and also permits the use of plated conductors. The use of a sealed contact chamber provides for the permanent immersion of the contacts in a suitable fluid and allows the use of unplated aluminum surfaces for the contact surfaces.

One object of the invention is to reduce the cost item to an insignificant amount. Another object, by providing the possibility of simple remote hydraulic operation is to eliminate the need for elaborate cages and interlocks to protect personnel when changing the connections in a dead run while adjacent runs are live. A further object is to gain additional safety by virtue of the fact that all contact surfaces are hermetically sealed and/or oil-immersed, so that no external flashing would occur even if one of the switches were accidentally disconnected under load.

The disconnect switch according to the invention is installed at an interleaving point between parallel or perpendicular bus runs, in place of a conventional "X-frame" bus clamp. It requires only that a hole be drilled through all of the bus leaves, and no separate hangers, brackets, stress relief joints, etc. are needed. A preferred embodiment of the invention is illustrated in the attached drawings in which.

Figures 1, 2, 3:
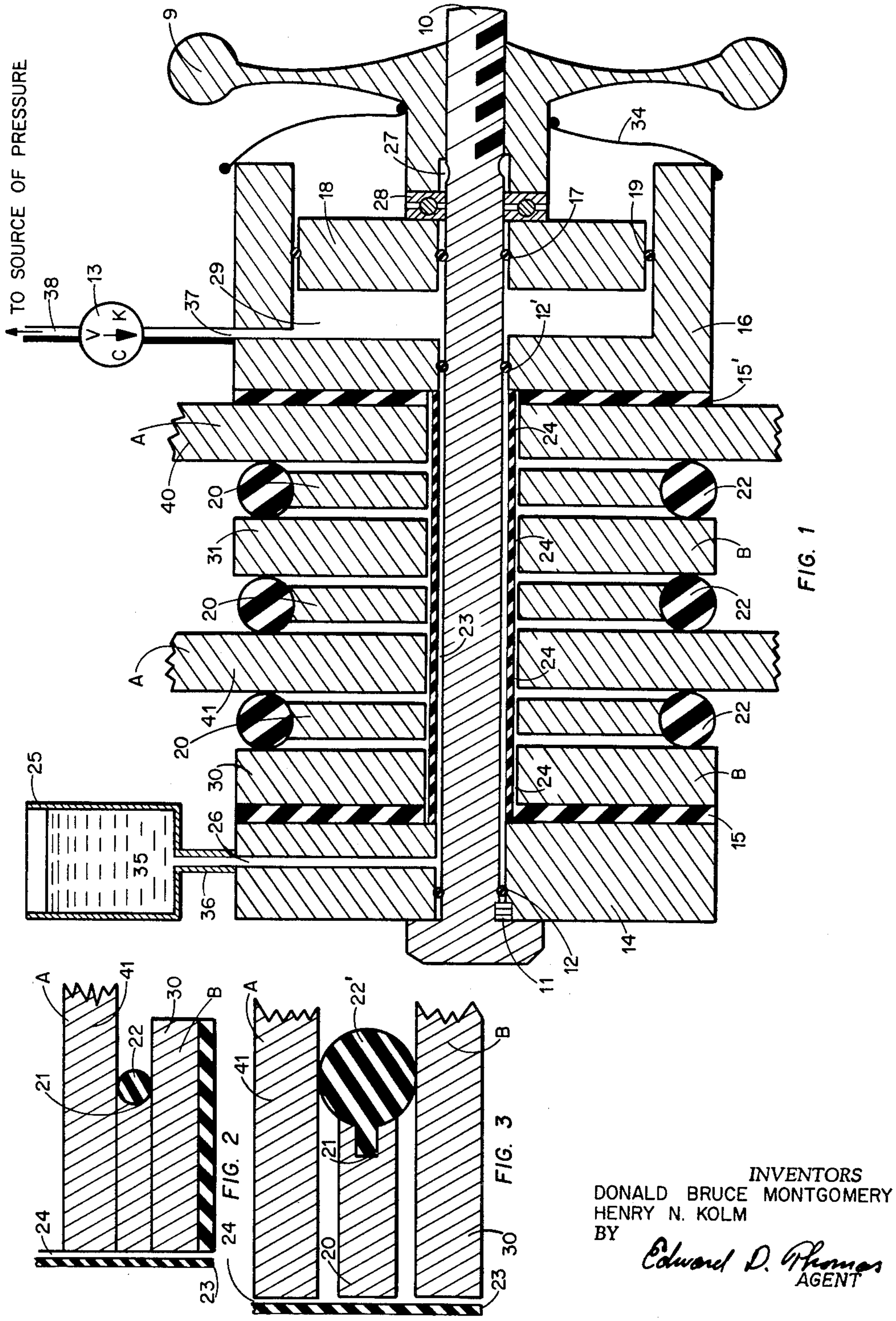
FIGURE 1 is a cross section view through the center of the intersection, with the switch in the disconnected position.
FIGURE 2 is a cross sectional detail of the arrangement of spacing washer and bus leaves in closed position of the switch of FIGURE 1.
FIGURE 3 is a cross sectional detail of a modified arrangement of FIGURE 2.

As shown in FIGURE 1, the switch possesses circular symmetry about a central bolt 10. The head end of this bolt is keyed by key 11 and sealed by O-ring 12 to a pressure distribution disk 14, which bears against the outermost bus bar leaf 30 of run B through an interposed washer 15 of suitable flexible insulating material such as rubber. The threaded extremity of the bolt 10 passes through a hole 24 in each bus bar, and O-ring seal 12′ in pressure head 16 which bears against the opposite outer bus bar leaf 40 of the intersection (in this case a leaf of run A) through a second insulating washer 15′. The bolt also passes through an O-ring seal 17 in a hydraulic actuating piston 18 and is finally threaded into the mating female threads in the hub of a handwheel 9. O-ring 19 acts as a sealing ring between piston 18 and the inner wall of piston well 29 in pressure head 16. A thrust bearing 28 between handwheel 9 and piston 18 permits the handwheel to turn without difficulty in the absence of pressure in piston well 29. Adjacent bus leaves are separated by copper contact spacing washers 20, each provided with a peripheral groove 21 (FIGURE 2) which accommodates an O-ring 22 under tension. O-rings 22 are made of an elastic, heat resisting material such as silicone rubber and are wider than the spacing washers 20, so that the bus leaves 30, 31, 40 and 41 are normally prevented from contacting the spacing washers 20. The central bolt 10 is of substantially smaller diameter than the holes in the bus leaves and spacing washers 20 and is prevented from making electrical contact with any of them by means of a loosely fitting insulator sleeve 23 which passes through the entire stack. Thus, alignment of the holes 24 in the bus leaves is not critical and any required amount of thermal expansion can be accommodated by allowing adequate clearance. The volume surrounding this sleeve communicates with the volumes between bus leaves 30, 31, 40 and 41 and contact spacer washers 20 and with a reservoir 25 connected by tube 36 to the pressure disk 14 by duct 26. The entire volume of the chamber so formed is filled with suitable insulating oil 35, leaving an air space in reservoir 25 for expansion as indicated. Reservoir 25 may be open to atmosphere or may be sealed, or alternatively the contact chamber volume may be connected via tubing 36 to a remote supply system maintained at a small positive pressure. The latter method simplifies inspection if a large number of switches are used in one installation.

The switch according to the invention operates in the following manner: After assembly of all component parts shown in FIGURE 1 and described above, the handwheel 9 is tightened just sufficiently to effect a hermetic seal between the O-rings 22 and adjacent bus leaves of runs A and B. This position may be determined by inspection, by the use of a clearance gauge or inside micrometer, or by backing the handwheel off the fully compressed position by a specified number of turns. The internal volume of the switch is then filled with insulating oil 35 through reservoir 25, tubing 36 and duct 26.

It should be noted that the contact chamber, formed by the bus bar leaves 30, 31, 40, 41, the contact spacing washers 20 with O-rings 22, sleeve 23, bolt 10, pressure plate 14, pressure head 16, and washers 15 and 15′, is sealed by O-rings 12 and 12′. O-ring 12′ particularly seals the contact chamber from the high pressure applied to piston 18, while O-ring 12 seals the chamber from the atmospheric pressure.

While the use of insulating oil, such as transformer oil, is mentioned, the use of an inert gas to provide a protective atmosphere is also contemplated.

A hydraulic pressure source (not shown) supplies operating pressure to the piston 18 by means of pipe line 38 connected through check valve 13 to duct 37 in pressure head 16. The bottom of piston 18 may be slightly rounded or have a slight taper to permit the entrance of fluid into piston well 29. Air may be bled from the hydraulic system by simply backing handwheel 9 off until the inside O-ring 17 has risen to groove 27 in bolt 10, while the hydraulic system is under low pressure.

The switch is now ready for operation, and can be closed manually by simply tightening the handwheel 9. In the closed position, the O-rings 22 will assume the distorted shape illustrated in FIGURE 2, allowing the bus leaves 30 and 41 to contact the spacer washer 20 as shown. The threaded extremity of the draw-bolt 10 will then protrude above the handwheel 9, giving visual indication that the switch is closed. In order to operate the switch by a remote hydraulic system rather than manually, the handwheel 9 is left in the open position (in which position it may be secured by a cotter pin or other suitable means, not shown) and pressure is introduced into the piston well 29 below piston 18 through the connecting duct 37. The draw-bolt 10 will then compress the stack without operation of the handwheel, the latter being forced upward by the piston 18. The piston well 29 in pressure head 16 is sealed above by a flexible rubber dust cap 34, or other suitable means. Protrusion of the entire handwheel 9 gives visual indication that the switch is closed by hydraulic operation, and the handwheel 9 is locked against accidental rotation by the pressure of piston 18 against thrust bearing 28. The one-way check-valve 13, placed in the hydraulic line between the switch and the hydraulic pressure source provides fail-safe operation by preventing the switch from opening accidentally under load if the hydraulic pressure should fail. The check valve can be by-passed by a needle valve (not shown), if desired, in order to open the switch manually following such failure.

By way of example, a disconnect switch for bus bar leaves 6 inches wide, having contact spacer washers 4 inches in diameter and ¼ inch thick with commercial ⅜′ O-rings of Buna N rubber, durometer reading 70, for a piston of a 4 inch diameter, the same size as the contact area, a pressure of 900 pounds per square inch applied to the piston was required to distort the O-rings enough to make an initial electrical contact. A further increase of pressure to 2500 p.s.i. resulted in a negligible contact resistance. It is well known that there is a rapid reduction in contact resistance with increasing contact pressure up to a pressure of about 2500 p.s.i. after which little further improvement can be obtained. It is believed that high spots on the contact surfaces are the first to make limited area contact and the application of further pressure produces a surface deformation and a greater area of contact is secured.

Maintenance requires merely occasional replacement of the insulating oil in reservoir 25 and of the O-rings, 12, 17, 22, and 28. Contact surfaces are permanently immersed and require no attention.

In large installations, it may become desirable to provide more positive means for ensuring that the O-rings 22 will not jump their grooves in the spacer washers 20. In this case, the O-rings are expediently replaced by rings 22′ of special cross section, molded or cemented to the washers if necessary. A suitable shape is illustrated in FIGURE 3.

Due to the fact that all contact surfaces are permanently sealed from atmosphere and kept under inert oil or gas, the switch permits use of aluminum bus bars without need for copper transitions or even silver plating, providing the aluminum oxide is removed after assembly by one of the known chemicals used for this purpose.

The foregoing description wherein the switch makes connection between two multiple-leaf bus bar runs is not intended to be limiting. Clearly, the switch structure is readily employed between bus runs having only a single bar. Further, single bus runs using bars of other structural shapes containing bends to improve rigidity, such as L-shaped bars or U-shaped channels can be connected together by the present switch structure in a manner similar to a flat bar.

The advantages of the present invention include hermetic sealing or oil immersion of all contact surfaces, minimum mechanical motion and wear, negligible contact resistance due to high contact pressure, adaptability for manual or fail-safe hydraulic operation, extreme flexibility and ease of application, and substantial reduction of manufacturing, installation and maintenance costs over any conventional type of disconnect switch.

Although we have shown and described a specific disconnect switch and a hydraulic operating mechanism therefor, it is to be understood that the same is for the purposes of illustration and that changes and modifications may occur to those skilled in the art without departing from the spirit and scope of the claims.

What is claimed is:

1. A switch for multiple leaf bus bar systems comprising a plurality of spacing washers, each having an inner metallic core and an outer resilient insulating ring thicker than said core, first and second multiple-leaf bus bar runs interleaved at a common intersection, each leaf of said first run being spaced by one of said washers from an adjacent leaf of said second run, means for clamping said bus bar runs and said washers together to form a chamber assembly hermetically sealed by distortion of said rings, a source of inert fluid communicating with said chamber to protect the surfaces of said metallic cores and said bus bar leaves from atmospheric contamination and means for compressing said assembly further to distort said resilient rings to force said bus bar leaves into electrical contact with said metallic cores.

2. A switch for high current multiple leaf bus bar systems comprising a plurality of spacing washers, each washer having an inner metallic core and an outer resilient insulating ring thicker than said core, first and second multiple-leaf bus bar runs interleaved at a common intersection, each leaf of said first run being spaced by one of said washers from an adjacent leaf of said second run, means for clamping said bus bar runs and said washers together to form a chamber assembly hermetically sealed by distortion of said rings wherein said washer cores are maintained in spaced relationship to said bus bar leaves free from atmospheric contamination, and fluid pressure responsive means for compressing said assembly further to distort said resilient rings to force said bus bar leaves into positive electrical contact with said metallic cores of said spacing washers.

3. A disconnect switch for high current multiple leaf bus bar systems comprising a plurality of spacing washers, each washer having an inner metallic core and an outer resilient insulating ring thicker than said core, first and second multiple-leaf bus bar runs interleaved at a common intersection, each leaf of said first run being spaced by one of said washers from an adjacent leaf of said second run, said rings serving to prevent contact between said bus bar leaves and said cores, means for clamping said bus bar runs and said washers together to form a chamber assembly hermetically sealed by distortion of said rings insufficient to produce electrical contact wherein said washer cores are maintained in spaced relationship to said bus bar leaves free from atmospheric contamination, and fluid pressure responsive means for compressing said assembly further to distort said resilient rings to force said bus bar leaves into positive electrical contact with said metallic cores of said spacing washers.

4. A high current disconnect switch for multiple leaf bus systems comprising a plurality of metallic contact disks, first and second multiple-leaf bus bar runs, said first and second runs meeting at a common intersection, each leaf of said first run being interleaved with and separated from adjacent leaves of said second run by one of said disks, a plurality of resilient insulating rings mounted on the periphery of said disks and serving to prevent said bus bar leaves from making contact with said disks, means for clamping said bus bar leaves and said contact disks with said rings together into a hermetically sealed chamber, a reservoir of insulating oil communicating with said chamber to protect said contact disks and said bus bar leaves within said chamber from atmospheric contamination and a hydraulic piston means for compressing said chamber under pressure whereby distortion of said resilient ring allows said bus bar leaves to make positive electrical contact with said contact disks.

5. A high current disconnect switch for multiple leaf bus systems comprising a plurality of metallic contact disks, first and second multiple-leaf bus bar runs, said first and second runs meeting at a common intersection, each leaf of said first run being interleaved with and separated from adjacent leaves of said second run by one of said disks, a plurality of resilient insulating rings mounted on the periphery of said disks and serving to prevent said bus bar leaves from making contact with said disks, means for clamping said bus bar leaves and said contact disks with said rings together into a hermetically sealed chamber, the distortion of said rings by said clamping means being insufficient to make electrical contact between said leaves and said disks, a reservoir of insulating oil communicating with said chamber to protect said contact disks and said bus bar leaves within said chamber from atmospheric contamination and a hydraulic piston means for compressing said chamber under pressure whereby greater distortion of said resilient rings allows said bus bar leaves to make positive electrical contact with said contact disks.

6. A high current disconnect switch for multiple leaf bus systems comprising a plurality of metallic contact disks, first and second multiple-leaf bus bar runs, said first and second runs meeting at a common intersection, each leaf of said first run being interleaved with and separated from adjacent leaves of said second run by one of said disks, a plurality of resilient insulating rings mounted on the periphery of said disks and serving to prevent said bus bar leaves from making contact with said disks, means for clamping said bus bar leaves and said contact disks with said rings together into a hermetically sealed chamber, the distortion of said rings by said clamping means being insufficient to make electrical contact between said leaves and said disks, a reservoir of insulating oil communicating with said chamber to protect said contact disks and said bus bar leaves within said chamber from atmospheric contamination, a hydraulic piston means for compressing said chamber assembly under pressure whereby greater distortion of said resilient rings allows said bus bar leaves to make positive electrical contact with said contact disks, and a check valve in said hydraulic means to prevent loss of hydraulic pressure from allowing said bus bar leaves to lose contact with said disks accidentally.

7. A disconnect switch for high current multiple bar bus systems comprising a plurality of metallic contact spacing washers, each washer having a resilient insulating ring mounted on the periphery thereof, first and second multiple bar bus runs interleaved to form an intersection, each bar of said first run being spaced at said intersection from an adjacent bar of said second run by one of said washers, said rings being thicker than said washers to prevent electrical contact between said bars and said washers, means for clamping said bus bars and said washers together under sufficient pressure to form a hermetically sealed chamber by distortion of said rings without making electrical contact, means for insulating said clamp electrically from said bus bars and said washers, a source of contact protective fluid communicating with said chamber, and a hydraulic operating mechanism for compressing said chamber to distort said rings further and to make a high pressure contact between said bus bars and said washers whereby surface distortion of said contact surfaces produces negligible contact resistance.

8. A high current disconnect switch for multiple-leaf bus systems comprising, a bolt having a head at one end and a threaded section at the second end, a pressure distribution plate fastened to the head end of said bolt, an insulated washer for said plate, an insulating sleeve surrounding said bolt, first and second multiple-leaf bus bar runs, said first and second runs being interleaved at a common intersection, each leaf of said first and second runs being provided with a hole symmetrical with said intersection, a plurality of metallic contact disks, each of said disks having an O-ring of flexible insulating material mounted on the periphery thereof, the thickness of said O-ring being greater than the thickness of said disk, each leaf of said first run being separated from adjacent leaves of said second run by one of said contact disks, said bolt and said insulating sleeve passing through said holes and said washers, said plate being spaced from the adjacent outer bus run leaf by said insulating washer, a piston and a cylinder positioned concentric with said shaft, said piston being free to slide along said shaft, said cylinder bearing against the opposite outer bus run leaf, an insulating washer disposed between said bus run leaf and said cylinder, a handwheel mating with the threaded end of said bolt, adjustment of said handwheel against said piston serving to tighten said assembly of pressure plate, bus bar leaves, O-rings, piston, cylinder and insulating washers into a hermetically sealed chamber, and means to introduce fluid under pressure into said cylinder whereby said piston acting against said handwheel serves to distort said O-rings allowing said bus leaves to make high pressure electrical contact with negligible resistance with said contact disks.

9. A switch for high current bus bar systems comprising, first and second bus bar runs meeting at a junction, a spacer having an inner metallic contact core and an outer resilient insulating ring thicker than said core, means for clamping said spacer between said first and second bus bar runs and said junction under sufficient pressure to form a hermetically sealed contact chamber by distortion of said ring without making electrical contact between said bars and said core, said clamp being electrically insulated from said bus bars and said spacer, means for introducing a protective fluid into said contact chamber, and means for compressing said chamber, further distorting said ring until a high pressure contact is established within said chamber between said bus bars and said metallic contact core.

10. A switch for high current bus systems, in which first and second current carrying bus bars meet at a junction, comprising a metallic contact disc having a resilient insulating ring mounted on the periphery thereof, said first bar being spaced from said second bar at said junction by said disc, said ring being thicker than said disc to prevent electrical contact between said disc and bars, means for clamping said bus bars and said disc together under sufficient pressure to form a hermetically sealed chamber by distorting said ring without making electrical contact, means for introducing a protective fluid into said sealed chamber, means for insulating said clamp electrically from said bars and said disc, and means for compressing said chamber further to distort said ring until high pressure contact is established between said bars and said disc.

11. A switch for high current bus systems, in which first and second current carrying bus bars meet at a junction, comprising a metallic contact disc having a resilient insulating ring mounted on the periphery thereof, said first bar being spaced from said second bar at said junction by said disc, said ring being thicker than said disc to prevent electrical contact between said disc and bars, means for clamping said bus bars and said disc together under sufficient pressure to form a hermetically sealed chamber by distorting said ring without making electrical contact, means for insulating said clamp electrically from said bars and said disc, a source of contact protective fluid communicating with said chamber, and means for compressing said chamber further to distort said ring until high pressure contact is established between said bars and said disc.

12. A switch for high current bus systems, in which first and second current carrying bus bars meet at a junction, comprising a metallic contact disc having a resilient insulating ring mounted on the periphery thereof, said first bar being spaced from said second bar at said junction by said disc, said ring being thicker than said disc to prevent electrical contact between said disc and bars, means for clamping said bus bars and said disc together under sufficient pressure to form a hermetically sealed chamber by distorting said ring without making electrical contact, means for insulating said clamp electrically from said bars and said disc, a source of contact protective fluid communicating with said chamber, and fluid pressure responsive means for compressing said chamber further to distort said ring until high pressure contact is established between said bars and said discs.

References Cited in the file of this patent

UNITED STATES PATENTS

| | | |
|---|---|---|
| 2,230,277 | Volken et al. | Feb. 4, 1941 |
| 2,445,588 | Skeats | July 20, 1958 |
| 2,877,324 | Oshry | Mar. 10, 1959 |
| 2,952,754 | Tomlinson | Sept. 13, 1960 |
| 2,957,968 | Matthysse et al. | Oct. 25, 1960 |

FOREIGN PATENTS

| | | |
|---|---|---|
| 535,440 | Italy | Nov. 14, 1955 |